United States Patent [19]

DiValentin

[11] 3,996,079
[45] Dec. 7, 1976

[54] METAL OXIDE/AZIDE GAS GENERATING COMPOSITIONS

[75] Inventor: Mario Angelo DiValentin, Otterburn Park, Canada

[73] Assignee: Canadian Industries, Ltd., Montreal, Canada

[22] Filed: Dec. 3, 1974

[21] Appl. No.: 529,035

[30] Foreign Application Priority Data

Dec. 17, 1973  United Kingdom .......... 58269l/73

[52] U.S. Cl. .................................... 149/35; 149/37
[51] Int. Cl.² .................. C06B 35/00; C06B 33/00
[58] Field of Search ......... 149/35, 37; 280/150 AB; 423/351, 641; 252/188.3 R, 188

[56] References Cited

UNITED STATES PATENTS

| | | | |
|---|---|---|---|
| 2,981,616 | 4/1961 | Boyer | 149/37 |
| 3,122,462 | 2/1964 | Kaufman | 149/35 |
| 3,741,585 | 6/1973 | Hendrickson | 149/35 |
| 3,785,674 | 1/1974 | Poole | 280/150 AB |
| 3,797,854 | 3/1974 | Poole | 280/150 AB |
| 3,883,373 | 5/1975 | Sidebottom | 149/35 |
| 3,895,098 | 7/1975 | Pietz | 149/35 |
| 3,931,040 | 1/1976 | Breazeale | 252/188.3 R |

FOREIGN PATENTS OR APPLICATIONS 2,185,982  5/1973  France

OTHER PUBLICATIONS

Perry, Chemical Engineers' Handbook 4th ed., McGraw-Hill pp. 8-60.

*Primary Examiner*—Samuel W. Engle
*Assistant Examiner*—Donald P. Walsh
*Attorney, Agent, or Firm*—Donald G. Ballantyne

[57] ABSTRACT

A gas generating composition containing nickel oxide or iron oxide and an alkali metal or alkaline earth metal azide, preferably fabricated in the form of tablets or granules. Upon ignition the composition generates nitrogen gas. The gas generating reaction takes place at a relatively low temperature and the solid products of the reaction form a sinter that is readily retained by a filter. The composition is useful for inflating the bags of automobile passive restraint systems.

5 Claims, No Drawings

METAL OXIDE/AZIDE GAS GENERATING COMPOSITIONS

This invention relates to a solid gas generating composition suitable for use in automobile passive restraint systems.

As a automobile safety device, it has been proposed to employ inflatable bags located in front of the driver and passengers. The bags are caused to inflate in response to rapid deceleration of the automobile, as would occur during an accident.

It is known to inflate such passive restraint bags by means of compressed gas released from a storage vessel. However, the use of compressed gas for this purpose entails certain disadvantages. A large heavy-walled vessel is required to store the gas under a pressure of about 3000 pounds per square inch. It is also necessary to ensure that the gas storage vessel remain sealed over a long period of time, ready for service in case of an accident.

It is also known to inflate the bag through the action of gas developed by a burning propellant or pyrotechnic composition. Black powder has been employed as the gas generating composition but has the disadvantage that the products of combustion are noxious. Compositions containing alkali metal azides have advantages as means for gas generation since the product of combustion is mainly nitrogen gas. Gas generating compositions containing azides are disclosed in U.S. Pat. Nos. 2,981,616; 3,122,462; 3,741,585; 3,755,182 and in the article by E. Zintl and H. H. V. Baumbach, "Über Natriumoxid" published in Zeitschrift fur anorganischeund allgemeine Chemie, volume 198, pages 88–101, 1931. Although the disclosed compositions generate nitrogen gas, this feature alone is not sufficient for effective operation of an automobile passive restraint system. Effective operation requires that the gas be generated rapidly but at a relatively low temperature. If the temperature of the reaction is high, difficulty will be experienced in providing adequate thermal insulation for the combustion chamber of the gas generator. Also high reaction temperatures result in the expulsion of high temperature liquid and solid products requiring large filter sections. It is advantageous to use compositions which burn producing only gaseous and solid products. Furthermore it is of great commercial importance that the solid products be in the form of a coarse sinter instead of a fine particle ash, which may escape into the bag of the restraint system. It is also desirable that the gas generating composition be insensitive to impact and friction.

A novel gas generating composition has been discovered which is well suited to use in an automobile passive restraint system. The composition comprises a mixture of an alkali metal or alkaline earth metal azide and an oxide of nickel or iron. The gas generating reaction takes place at 1000° C or less and the solid products of the reaction form a sinter. The composition has a high auto ignition temperature and is insensitive to impact and friction.

Thus the main object of the present invention is to provide a gas generating composition that is suited to inflating the bag of an automobile passive restraint system. Additional objects will appear hereinafter.

The composition of this invention comprises a mixture of particles of nickel oxide or iron oxide and alkali metal or alkaline earth metal azide in molar proportions adequate to oxidize all the azide to nitrogen and alkali metal oxide or alkaline earth metal oxide. Sometimes it is desirable to employ a small molar excess of the metal oxide.

In the case of the nickel oxide/sodium azide composition the reaction may be represented by the following equation:

$$NiO + 2NaN_3 \rightarrow Ni + Na_2O + 3N_2 \qquad (1)$$

The reaction between nickel oxide and sodium azide in molar ratio of 1:2 had the following calculated reaction characteristics:

| | |
|---|---|
| Heat of reaction | 25.0 K cal per 100 g composition |
| Gas yield | 1.16 cu ft at standard temperature and pressure per 100 g of composition |
| Yield of solids | 59 g per 100 g of composition |
| Combustion chamber temperature, found | Ca 1000° C , (calculated Tp = 1120° C). |

It can be assumed that the reaction with ferric oxide follows the equation:

$$Fe_2O_3 + 6NaN_3 \rightarrow 2Fe + 3Na_2O + 9N_2 \qquad (2)$$

with heat of reaction per 100 g equal 24 k cal/100 g, gas output 1.29 c.ft/100 g at standard temperature and pressure with 54 g/100 g of solid residue. The combustion chamber temperature was found to be between 660° C and 735° C., (calculated Tp = 911° C).

Defining x as weight percent of excess of metal oxide in respect to the stoichiometric amount, the compositions were tested varying x from −10 to +10%. For NiO x = 0 gave the fastest burn rates, highest flame temperature and the highest registered combustion chamber pressure. For $Fe_2O_3$ the similar results were obtained for $x = 5\%$. Analysis of the sinter indicated a small amount of metallic sodium present.

It has been reported E. K. Bunzel and E. J. Kohlmeyer, Z. anorg. Chem. 254, 1–30 (1947); P. Gross and G. L. Wilson, J. Chem. Soc. A1970, (11), (1913–16) that at temperatures above 550° C iron reacts with sodium oxide to form a double oxide ($Na_2O)_2$ FeO. If such a reaction takes place during the burning of an iron oxide-sodium azide composition an alternative reaction can be represented by the equation $$Fe_2O_3 + 4NaN_3 \rightarrow Fe + (Na_2O)_2 \cdot FeO + 6N_2 \qquad (3)$$

with heat of reaction equivalent to 27 K cal per 100 grams of composition, gas output of 1.13 cu ft per 100 grams of composition at standard temperature and pressure, and 60 grams of solid residue per 100 grams of composition. Judging by the amount of free sodium found in the sinter, the calculated flame temperatures and experimentally found lower gas output with respect to the nickel oxide-sodium azide composition reaction (3) appears more probable.

Nickel oxides of the general formula $NiO_n$ are prepared by calcining a nickel salt such as nickel carbonate. Depending upon the calcination temperature n varies from 1.15 to 1.005. Parallel with the variation in oxygen content the physical and chemical properties of nickel oxide vary as well. It is recognized that black nickel oxide, prepared at low calcination temperatures, has higher chemical and catalytic activity than the yellow-green form obtained by calcination at high temperatures. It is advantageous to use the reactive black form of nickel oxide in the gas generating compositions of this invention, adjusting the weight ratio of azide to nickel oxide to compensate for the variation in oxygen content of the nickel oxide.

The particle size of commercial nickel oxide depends upon the precipitation temperature employed during purification of the nickel carbonate from which the oxide is prepared. The particle size may vary from an average value of 7μm to 40μm. Smaller particle sizes are obtained by milling and/or classifying the product. The iron oxide ingredient consists of the ferric oxides of commerce. In experimental work six different types of ferric oxide were tested. The first four were chemically produced via ferric chloride, the last two by slow oxidation of steel. The scanning electron micrographs indicated a substantial difference in particle type and size between these two classes. In the first, small < 0.6μm diameter, fluffy particles were observed. In the second, larger < 3μm crystal-like particles were seen. These differences were also reflected in specific surface area and tap density measurements. The best results were obtained by using a ferrite type iron oxide with acicular particles.

Suitable azide ingredients of the compositions are lithium azide, sodium azide, potassium azide, rubidium azide, cesium azide, calcium azide, magnesium azide, strontium azide and barium azide.

The ingredients of the gas generating composition are employed in particulate form. To assure reliability of the product it is desirable to employ material in the particle size less than 100 mesh Tyler screen size. In the case of the metal oxide ingredient coarse particle size may lead to difficulty in initiating ignition. When employed in an automobile passive restraint system the composition conveniently is prepared in the form of pressed tablets, powders or granules, depending upon the desired reaction time.

It has been found that, in order to obtain the desired sintered solid combustion product, pressed tablets or granules prepared by wet granulation are the most suitable forms for fabricating the gas generating composition.

A suitable granulation procedure comprises mixing the dry ingredients with sufficient granulating fluid to produce a plastic mass. The amount of fluid required will depend upon the physical and chemical characteristics of the ingredients. Generally the granulating fluid will be about 15% by weight of the composition. The amount of fluid required can be kept to a minimum by the use of high energy mixing and extruding equipment. It is believed that the granulating fluid dissolves the finer particles of the azide ingredient to form a solution which wets the remaining solids and fills the voids between the particles. The material in solution apparently is deposited, during the subsequent drying process, on the larger particles and in the voids between contacting particles. Suitable granulating fluids are water or aqueous ethanol solution. The plastic mass is then forced or extruded through a die, a perforated plate or sieve to form wet granules. A sieve of Tyler No. 4 to 20 mesh is of size suitable for wet granulation. The wet granules are then dried.

In order to obtain proper mechanical strength and desired burn rate, the mixing and drying time, as well as the drying temperatures have to be closely controlled. It is preferred to keep the mixing times below 15 minutes and the drying cycle as follows: — 2 hours at 30° C, 2 hours at 60° C and 7 hours at 105° C.

It is advantageous to screen the dry granules separating or extracting a fraction of the desired particle size. Generally the burn rate depends upon the ⅔ power of the average particle diameter (e.g. if the linear burn rate for $D = 1$ mm is 25 cm/sec., particles with $D = 4$ mm will burn with the rate 10 cm/sec.) In order to achieve high and reliable burn rates it is important to keep the particle size distribution quite narrow; e.g. particles which pass through a no. 4 mesh Tyler screen but not through a No. 6 mesh (or between No. 6 and No. 8 or between No. 8 and No. 12) have a suitable particle size distribution.

An improvement in the extrusion characteristics of the plastic material and in the burning profile, mechanical strength and packing density of the granules can be obtained by mixing with the active ingredients of the composition, prior to granulation, a minor amount (0.5% to 3.0%) of an inert material such as clay.

The physical shape of the gas generating material has to be selected on the basis of the desired burn rate and volume of gas to be produced, and the amount of solid material that can be allowed to pass through the filter of the gas generating apparatus. Since the total burn time of the material depends upon the linear burn rate and the depth of flame propagation the proper burn characteristics can be achieved by selecting a composition having a lower burn rate but made in a form which will guarantee appropriate flame channelling during burning.

A variety of techniques may be used to cause a change in burning rates. The tablet size and geometry can be changed; granules or powders can be used instead of tablets; and primers with a high calorific output can be used to increase the burning rates.

Keeping all parameters constant a five fold variation in linear burn rate can be achieved by varying the pressure (i.e. a degree of compaction) during the tableting or granulating process.

The gas generating composition of this invention has the following advantages

1. The combustion temperature of the composition is sufficiently low that thermal insulation of the gas generator is not required. The generator no longer constitutes a fire hazard with any of the combustible materials to be found in either the steering wheel or dashboard of an automobile.

2. The size of filter bed needed to remove the solid products of the reaction can be greatly reduced. In a known generator employing a composition containing sodium azide and potassium perchlorate the filter bed constitutes 75% of the volume of the gas generator. In the case of the composition of this invention the filter bed requires typically 10% of the volume of the generator.

3. Because of the reduction in size of the filter bed required with the gas generating composition of the present invention a reduction in size of the gas generator is possible.

4. Because of the low combustion temperature of the composition of this invention and the sintering of the solid products, filtering of the products of the reaction is simplified.

As a result, metal or glass fibres or ceramic filter pads can be used as filter with the composition of this invention. The latter materials have a low volume, light weight, low cost and good filtering characteristics.

5. There are a variety of commercial types of nickel and iron oxides available so that a range of burning

EXAMPLE 2

Using mixtures of sodium azide and black NiO or 0.7µm $Fe_2O_3$ a series of compositions were made varying the excess of metal oxide from x = −10% to x = +10% by weight over the stoichiometric requirements. The tests were performed as in Example I, except that an electric ignitor was used instead of black powder and hot wire system. The average values of maximum pressure and 80% burn time, based on 3–5 burn tests are listed in Table II.

TABLE II

| Metal Oxide | X % | Maximum Pressure (psi) | $t_{10-90}$ (sec) |
|---|---|---|---|
| Black NiO | −10 | 2500 ± 60 | 0.546 ± 0.016 |
|  | −5 | 2620 ± 20 | 0.434 ± 0.005 |
|  | 0 | 2790 ± 20 | 0.392 ± 0.005 |
|  | +5 | 2350 ± 100 | 0.452 ± 0.035 |
|  | +10 | 1820 ± 100 | 0.622 ± 0.042 |
| 0.7µm $Fe_2O_3$ | −10 | 2207 ± 30 | 1.114 ± 0.624 |
|  | −5 | 2234 ± 30 | 1.014 ± 0.032 |
|  | 0 | 2248 ± 25 | 0.672 ± 0.011 |
|  | +5 | 2276 ± 40 | 0.538 ± 0.025 |
|  | +10 | 2214 ± 45 | 0.575 ± 0.035 |

EXAMPLE 3

$Fe_2O_3$ and $NaN_3$ screened powders were intimately dry blended. From this mix six different batches of 1 inch diameter, 20g tablets were made varying the compressing pressure from 1,000 to 25,000 psi. The tests were performed as in Example 2. The results are given in Table III.

TABLE III

| Ram Pressure ($10^3$ psi) | Tablet Density (g/cc) | Ignition delay (sec) | Time, till Max. Pressure (sec) | Max. Pressure Gradient (psi/ms) |
|---|---|---|---|---|
| 1 | 1.980 ± 0.004 | 0.47 ± 0.04 | 1.23 ± 0.08 | 2.36 ± 0.02 |
| 2 | 1.990 ± 0.002 | 0.52 ± 0.12 | 1.31 ± 0.12 | 2.31 ± 0.05 |
| 4 | 2.023 ± 0.002 | 0.57 ± 0.06 | 1.53 ± 0.04 | 2.17 ± 0.11 |
| 8 | 2.068 ± 0.004 | 0.69 ± 0.11 | 1.63 ± 0.21 | 1.98 ± 0.21 |
| 16 | 2.123 ± 0.002 | 0.81 ± 0.08 | 1.86 ± 0.04 | 1.71 ± 0.08 |
| 25 | 2.159 ± 0.002 | 0.89 ± 0.21 | 2.02 ± 0.23 | 1.63 ± 0.06 |

EXAMPLE 4

The effect of aging and humidity was investigated. Samples consisting of mixtures of sodium azide and black nickel oxide in tablet form of the type described in Example 2 were kept in an enclosed vessel for ten months. During the first month the temperature of the samples was periodically increased to 100° C then lowered to ambient. No detectable change in the burning characteristics of the material was found. However, increasing the moisture content from the standard 0.02% by weight up to 0.62% by weight resulted in 60% longer burn time.

EXAMPLE 5

Granules of gas generating composition were prepared by a wet granulation procedure. 103.089 grams of black nickel oxide were mixed with 196.911 grams of sodium azide. About a third of the mixture was placed in a beaker and mixed with a small amount of 20% ethanol in water solution. Additional ethanol solution was added with mixing sufficient to form a plastic product. The plastic product was then forced through a 6 mesh Tyler screen and spread on aluminum foil to dry. The remainder of the mixture was then treated in the same manner. The material was allowed to dry for 4 hours. Upon drying some lumps were formed. The product was screened through a Tyler No. 4 mesh sieve and then through a Tyler No. 6 mesh sieve. The granules had a length of ¼ to ⅜ inch. Upon analysis the material was found to contain 0.48% by weight of water.

When compared with tablets formed by compression the granules were found to have adequate strength but a lower bulk density. When tested in a miniature gas generator the burning rate of the granules was satisfactory, although the peak pressures in the combustion chamber were high - Ca 3000 p.s.i. The solid product of combustion was in the form of a sintered mass.

What we claim is:

1. A process for the preparation of a gas generating composition adapted on burning to form nitrogen gas and a solid residue in the form of a sintered mass, comprising the steps of - a) preparing a mixture consisting essentially of dry particles of nickel oxide or iron oxide and dry particles of alkali metal azide or alkaline earth metal azide in molar proportions adequate on burning to oxidize all the azide to nitrogen and form alkali metal oxide or alkaline earth metal oxide, b) adding sufficient fluid to the dry mixture to dissolve at least some of the azide and provide a mixture of granulating consistency, c) mixing the fluid-containing mixture to form a plastic-like blend, d) forcing the plastic-like blend through a perforated plate, screen or die, thus forming wet granules, e) drying the wet granules, and f) screening the dried granules to separate and retain for use groups of particles having a narrow particle size distribution, the resultant product producing upon burning a residue in the form of an easily filterable sintered mass.

2. A process as claimed in claim 1 wherein the granulating fluid is an aqueous solution of ethanol.

3. A process as claimed in claim 1 wherein the granulating fluid is water.

4. A process as claimed in claim 1 wherein a minor quantity of an inert material is added to the dry mixture.

5. A process as claimed in claim 4 wherein the inert material is clay.

* * * * *